United States Patent
Nagaoka

(10) Patent No.: US 10,875,010 B2
(45) Date of Patent: Dec. 29, 2020

(54) PGM NANOPARTICLES TWC CATALYSTS FOR GASOLINE EXHAUST GAS APPLICATIONS

(71) Applicant: Johnson Matthey Public Limited Company, London (GB)

(72) Inventor: Shuhei Nagaoka, Tochigi (JP)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/864,314

(22) Filed: May 1, 2020

(65) Prior Publication Data

US 2020/0353445 A1   Nov. 12, 2020

Related U.S. Application Data

(60) Provisional application No. 62/843,695, filed on May 6, 2019.

(51) Int. Cl.

| B01J 23/42 | (2006.01) |
|---|---|
| B01J 35/02 | (2006.01) |
| B01J 35/00 | (2006.01) |
| B01D 53/94 | (2006.01) |
| F01N 3/10 | (2006.01) |
| B01J 21/04 | (2006.01) |

(52) U.S. Cl.
CPC ............ *B01J 23/42* (2013.01); *B01D 53/945* (2013.01); *B01J 21/04* (2013.01); *B01J 35/0013* (2013.01); *B01J 35/023* (2013.01); *F01N 3/101* (2013.01); *B01D 2255/1021* (2013.01); *B01D 2255/9202* (2013.01)

(58) Field of Classification Search
CPC ......... F01N 3/101; B01J 23/42; B01J 35/023; B01D 53/945; B01D 2255/9202
USPC ........................................................ 422/168
See application file for complete search history.

(56) References Cited

U.S. PATENT DOCUMENTS

| 2016/0059216 A1 | 3/2016 | Qi et al. |
| 2018/0071718 A1 | 3/2018 | Kanazawa et al. |
| 2018/0111111 A1* | 4/2018 | Yang .................. B01J 35/0013 |
| 2019/0015781 A1 | 1/2019 | Wei et al. |

FOREIGN PATENT DOCUMENTS

| EP | 2461905 B1 | 6/2017 |
| JP | 2017200674 A | 11/2017 |

* cited by examiner

*Primary Examiner* — Tom P Duong
(74) *Attorney, Agent, or Firm* — Ni Yan

(57) ABSTRACT

A three-way catalyst article, and its use in an exhaust system for internal combustion engines, is disclosed. The catalyst article for treating exhaust gas comprising: a substrate; and a first catalytic region on the substrate; wherein the first catalytic region comprises a first platinum group metal (PGM) component and a first inorganic oxide, wherein the first PGM component comprises PGM nanoparticles, wherein the PGM nanoparticles have no more than 100 PGM atoms, and wherein the PGM nanoparticles have a mean particle size of 1 nm to 10 nm with a standard deviation (SD) no more than 1 nm.

20 Claims, 12 Drawing Sheets

PGM NANOPARTICLES TWC CATALYSTS FOR GASOLINE EXHAUST GAS APPLICATIONS

FIELD OF THE INVENTION

The present invention relates to a catalyzed article useful in treating exhaust gas emissions from gasoline engines.

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is the TWC. TWCs perform three main functions: (1) oxidation of CO; (2) oxidation of unburnt HCs; and (3) reduction of $NO_x$ to $N_2$.

In most catalytic converters, platinum group metals (PGMs) (e.g., Pt, Pd, and Rh) have been widely used as active site of catalytic conversion with other inorganic compounds e.g. alumina and ceria-zirconia mixed oxide for the support carriers. PGM formed as nanoparticle with face-centered-cubic (fcc) crystal structure is a leading part of catalytic reactions and keeping higher dispersion of the PGM nanoparticle under aging condition (especially under harsh aging conditions) has been a major issue for the improvement of TWC performance. Use of size-controlled nanoparticles rather than wide-distributed particles in size, which are usually produced by impregnation of PGM salts, is one of approaches to keep higher dispersion of the PGM nanoparticles after the aging (for example, see Miura et al., SAE Technical Paper 2015-01-1005).

Recently, on the other hand, non-fcc type PGM nanoparticle clusters with the size below 100 atoms has been found and they are known to exhibit unique chemical properties and functions different from bulk metals including fcc type nanoparticle, and studies therefor are conducted in various fields. In platinum clusters, for example, academic studies of the oxidation catalyst properties against carbon monoxide has been conducted (e.g., see, *Journal of the American Chemical Society*, 1999, 121 (13), 3214-3217; *Journal of Materials Chemistry A*, 2017, 5, 4923-4931; and *Catalysis Science & Technology*, 2011, 1, 1490-1495) while the studies have been only focused on fundamental research and not been applied into TWC applications since it has been expected that the thermostability of the non-fcc PGM cluster materials should not be enough under operation temperature of TWC around 1000° C.

For the future-expected gasoline engine strategy focused on motor-assisted hybrid or turbo-charger system which will be providing lower-temperature exhaust gasses, effective-size-tuned as well as functional tuned technologies of PGM nanomaterials to fit this application condition would be major challenge of the TWC development. This invention solves these needs to reduce the emission of the pollutants under condition of lower-temperature TWC applications by using effective-size selected nanoparticle of PGM cluster materials below 100 atoms with the unique functions.

SUMMARY OF THE INVENTION

One aspect of the present disclosure is directed to a catalyst article for treating exhaust gas comprising: a substrate; and a first catalytic region on the substrate; wherein the first catalytic region comprises a first platinum group metal (PGM) component and a first inorganic oxide, wherein the first PGM component comprises PGM nanoparticles, wherein the PGM nanoparticles have no more than 100 PGM atoms, and wherein the PGM nanoparticles have a mean particle size of 1 nm to 10 nm with a standard deviation (SD) no more than 1 nm.

The invention also encompasses an exhaust system for internal combustion engines that comprises the three-way catalyst component of the invention.

The invention also encompasses treating an exhaust gas from an internal combustion engine, in particular for treating exhaust gas from a gasoline engine. The method comprises contacting the exhaust gas with the three-way catalyst component of the invention.

DETAILED DESCRIPTION OF THE INVENTION

Figure 1:
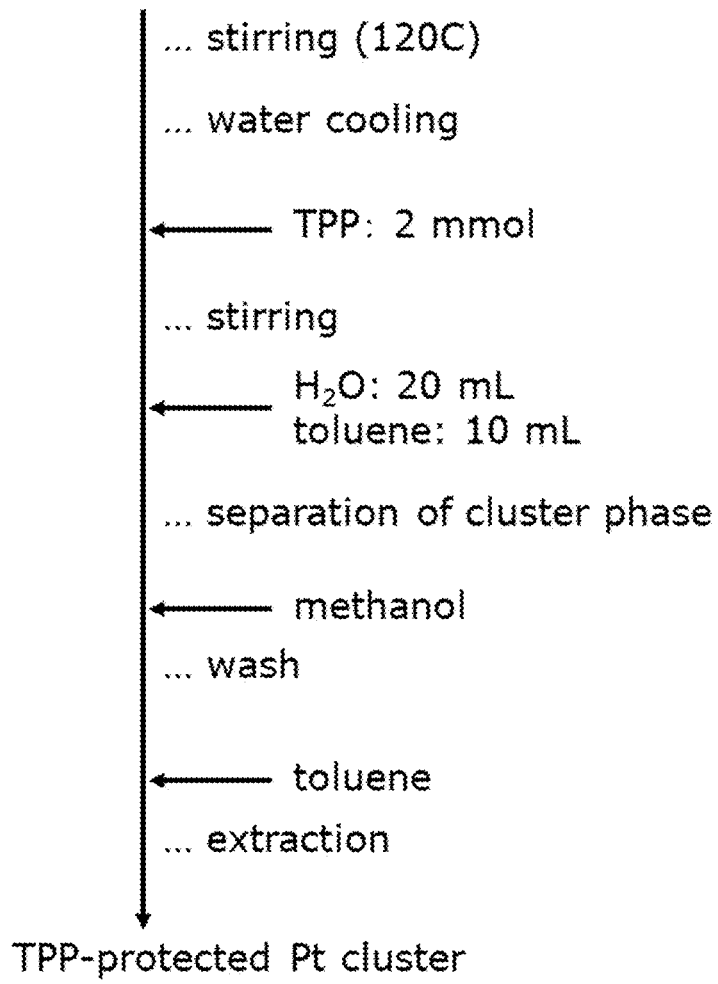
FIG. 1 shows a flow diagram to synthesis triphenylphosphine (TPP)-protected Pt cluster.

The present invention is directed to the catalytic treatment of combustion exhaust gas, such as that produced by gasoline engines or other engines, and to related catalytic articles and systems. More specifically, the invention relates the simultaneous treatment of $NO_x$, CO, and HC in a vehicular exhaust system. The inventors have discovered an effective average size and the distribution of PGM for TWC applications to reduce the emission of $NO_x$, CO, and HC through effective suppression of sintering of PGM during aging. The processes of the present invention can potentially reduce the PGM amount and lower costs of the catalyst.

One aspect of the present disclosure is directed to a catalyst article for treating exhaust gas comprising: a substrate; and a first catalytic region on the substrate; wherein the first catalytic region comprises a first platinum group metal (PGM) component and a first inorganic oxide, wherein the first PGM component comprises PGM nanoparticles, wherein the PGM nanoparticles have no more than 100 PGM atoms, and wherein the PGM nanoparticles have a mean particle size of 1 nm to 10 nm with a standard deviation (SD) no more than 1 nm.

The PGM nanoparticles can be Pd, Rh, or Pt. In further embodiments, the PGM nanoparticles are Pt.

The PGM (e.g., Pt) nanoparticles can have no more than 100 PGM (e.g., Pt) atoms (corresponding to mass number of no more than 24 kDa with organic protecting ligands, if the PGM is Pt), preferably, no more than 75 PGM (e.g., Pt) atoms; more preferably, no more than 65 PGM (e.g., Pt) atoms.

Alternatively, the PGM (e.g., Pt) nanoparticles can have 2-100 PGM (e.g., Pt) atoms, 30-100 PGM (e.g., Pt) atoms, 40-80 PGM (e.g., Pt) atoms, or 55-65 PGM (e.g., Pt) atoms.

The Pt nanoparticles can have mass number of 8-20 kDa, 8-18 kDa, or 8-16 kDa with organic protecting ligands of phenyl ethanethiol, for example.

In some embodiments, the PGM (e.g., Pt) nanoparticles can have a mean particle size of 1 nm to 10 nm with a SD no more than 0.8 nm, 0.6 nm, 0.5 nm, 0.4 nm, or 0.3 nm.

The PGM (e.g., Pt) nanoparticles can have a mean particle size of 1 nm to 5 nm with a SD no more than 1.0 nm, 0.8 nm, 0.6 nm, 0.5 nm, 0.4 nm, or 0.3 nm. The PGM (e.g., Pt) nanoparticles can have a mean particle size of 1 nm to 4 nm with a SD no more than 1.0 nm, 0.8 nm, 0.6 nm, 0.5 nm, 0.4 nm, or 0.3 nm. The PGM (e.g., Pt) nanoparticles can have a mean particle size of 1 nm to 3 nm with a SD no more than 1.0 nm, 0.8 nm, 0.6 nm, 0.5 nm, 0.4 nm, or 0.3 nm. The PGM (e.g., Pt) nanoparticles can have a mean particle size of 2 nm to 3 nm with a SD no more than 1.0 nm, 0.8 nm, 0.6 nm, 0.5 nm, 0.4 nm, or 0.3 nm.

To the inventors' surprise, they have found that the PGM (e.g., Pt) nanoparticles of the present invention have shown improved thermostabilities and enhanced TOF after harsh hydrothermal ageing condition, when compared with the conventional PGM (e.g., Pt) nanoparticles.

The Pt nanoparticles can have a mean particle size of no more than 15 nm after hydrothermal redox aging at 600° C. for 4 hours, wherein the mean particle size is measured by Transmission Electron Microscope (TEM). The Pt nanoparticles can have a mean particle size of no more than 13 nm after hydrothermal redox aging at 600° C. for 4 hours, wherein the mean particle size is measured by TEM. The Pt nanoparticles can have a mean particle size of no more than 10 nm after hydrothermal redox aging at 600° C. for 4 hours, wherein the mean particle size is measured by TEM.

The Pt nanoparticles can have a mean particle size of no more than 20 nm after hydrothermal redox aging at 700° C. for 4 hours, wherein the mean particle size is measured by TEM. The Pt nanoparticles can have a mean particle size of no more than 18 nm after hydrothermal redox aging at 700° C. for 4 hours, wherein the mean particle size is measured by TEM. The Pt nanoparticles can have a mean particle size of no more than 16 nm after hydrothermal redox aging at 700° C. for 4 hours, wherein the mean particle size is measured by TEM.

The Pt nanoparticles can have a mean particle size of no more than 25 nm after hydrothermal redox aging at 800° C. for 4 hours, wherein the mean particle size is measured by TEM. The Pt nanoparticles can have a mean particle size of no more than 24 nm after hydrothermal redox aging at 800° C. for 4 hours, wherein the mean particle size is measured by TEM. The Pt nanoparticles can have a mean particle size of no more than 23 nm after hydrothermal redox aging at 800° C. for 4 hours, wherein the mean particle size is measured by TEM.

The Pt nanoparticles can have a mean particle size of no more than 50 nm after aging at 1000° C. for 4 hours, wherein the mean particle size is measured by TEM. The Pt nanoparticles can have a mean particle size of no more than 40 nm after aging at 1000° C. for 4 hours, wherein the mean particle size is measured by TEM. The Pt nanoparticles can have a mean particle size of no more than 30 nm after aging at 1000° C. for 4 hours, wherein the mean particle size is measured by TEM.

The Pt nanoparticles can have a mean particle size of no more than 30 nm after hydrothermal redox aging at 800° C. for 4 hours, wherein the mean particle size is measured by CO-pulse method. The Pt nanoparticles can have a mean particle size of no more than 25 nm after hydrothermal redox aging at 800° C. for 4 hours, wherein the mean particle size is measured by CO-pulse method.

The Pt nanoparticles can have a mean particle size of no more than 60 nm after hydrothermal redox aging at 900° C. for 4 hours, wherein the mean particle size is measured by CO-pulse method. The Pt nanoparticles can have a mean particle size of no more than 55 nm after hydrothermal redox aging at 900° C. for 4 hours, wherein the mean particle size is measured by CO-pulse method. The Pt nanoparticles can have a mean particle size of no more than 50 nm, 45 nm, or 40 nm after hydrothermal redox aging at 900° C. for 4 hours, wherein the mean particle size is measured by CO-pulse method.

The Pt nanoparticles can have a mean particle size of no more than 85 nm after aging at 1000° C. for 4 hours, wherein the mean particle size is measured by CO-pulse method. The Pt nanoparticles can have a mean particle size of no more than 80 nm after aging at 1000° C. for 4 hours, wherein the mean particle size is measured by CO-pulse method.

In some embodiments, the Pt nanoparticles are atomically resolved. The atomically resolved Pt nanoparticles can have 12 to 28 Pt atoms; in some embodiments, the atomically resolved Pt nanoparticles can have 14 to 20 Pt atoms; in further embodiments, the atomically resolved Pt nanoparticles can have 15-19 Pt atoms whose content can be more than 70% of total Pt nanoparticle cluster synthesized.

The composition can have the peak in the wavenumber spectrum of CO adsorbed on platinum of no more than 2080 $cm^{-1}$ at 200° C., measured by IR spectroscopy. The composition can have the peak in the wavenumber spectrum of CO adsorbed on platinum of no more than 2070 $cm^{-1}$ at 200° C., measured by IR spectroscopy.

The first catalytic region can comprise up to 350 $g/ft^3$ of the PGM (e.g., Pt) nanoparticles. Preferably, the first catalytic region can comprise 10-300 $g/ft^3$, more preferably, 25-150 $g/ft^3$ of the PGM (e.g., Pt) nanoparticles.

The first inorganic oxide is preferably an oxide of Groups 2, 3, 4, 5, 13 and 14 elements. The first inorganic oxide is preferably selected from the group consisting of alumina, magnesia, lanthana, silica, neodymium, praseodymium, yttrium oxides, titania, niobia, tantalum oxides, molybdenum oxides, tungsten oxides, and mixed oxides or composite oxides thereof. More preferably, the first inorganic oxide is selected from the group consisting of alumina, magnesia, silica, lanthanum, neodymium, praseodymium, yttrium oxides, and mixed oxides or composite oxides thereof. Particularly preferably, the first inorganic oxide is alumina, a lanthanum/alumina composite oxide, or a magnesia/alumina composite oxide. One especially preferred first inorganic oxide is a lanthanum/alumina composite oxide. The first inorganic oxide may be a support material for the PGM nanoparticles, and/or for the first alkali or alkaline earth metal.

The first inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g. high surface area alumina. Other preferred first inorganic oxides include lanthanum/alumina composite oxides, optionally further comprising a cerium-containing component, e.g., ceria. In such cases the ceria may be present on the surface of the lanthanum/alumina composite oxide, e.g., as a coating.

The first catalytic region can further comprise a first oxygen storage capacity (OSC) material, and/or a first alkali or alkaline earth metal component.

The total washcoat loading of the first catalytic region can be from 0.1 to 5 $g/in^3$. Preferably, the total washcoat loading of the first catalytic region is 0.5 to 3.5 $g/in^3$, most preferably, the total washcoat loading of the first catalytic region is 1 to 2.5 $g/in^3$.

The first OSC material is preferably selected from the group consisting of cerium oxide, zirconium oxide, a ceria-zirconia mixed oxide, and an alumina-ceria-zirconia mixed oxide. More preferably, the first OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the first OSC material may function as a support material for the PGM nanoparticles. In some embodiments, the PGM nanoparticles are supported on the first OSC material and the first inorganic oxide The first OSC material (e.g., ceria-zirconia mixed oxide) can be from 10 to 90 wt %, preferably, 25-75 wt %, more preferably, 35-65 wt %, based on the total washcoat loading of the first catalytic region.

The first OSC material loading in the first catalytic region can be less than 1.5 $g/in^3$. In some embodiments, the first OSC material loading in the first catalytic region is no greater than 1.2 $g/in^3$, 1.0 $g/in^3$, 0.9 $g/in^3$, 0.8 $g/in^3$, 0.7 $g/in^3$, or 0.6 $g/in^3$.

The first OSC material and the first inorganic oxide can have a weight ratio of no greater than 10:1, preferably, no greater than 8:1 or 5:1, more preferably, no greater than 4:1 or 3:1, most preferably, no greater than 2:1.

Alternatively, the first OSC material and the first inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the first alkali or alkaline earth metal may be deposited on the first OSC material. Alternatively, or in addition, the first alkali or alkaline earth metal may be deposited on the first inorganic oxide. That is, in some embodiments, the first alkali or alkaline earth metal may be deposited on, i.e. present on, both the first OSC material and the first inorganic oxide.

Preferably the first alkali or alkaline earth metal is supported/deposited on the first inorganic oxide (e.g., alumina). In addition to, or alternatively to, being in contact with the first inorganic oxide, the first alkali or alkaline earth metal may be in contact with the first OSC material and also the PGM nanoparticles.

The first alkali or alkaline earth metal is preferably barium or strontium. Preferably the barium or strontium, where present, is present in an amount of 0.1 to 15 weight percent, and more preferably 3 to 10 weight percent, based on the total washcoat loading of the first catalytic region.

Preferably the barium is present as a $BaCO_3$ composite material. Such a material can be performed by any method known in the art, for example incipient wetness impregnation or spray-drying.

The first PGM component can further comprise another PGM. The another PGM can be selected from the group consisting of platinum, palladium, rhodium, and a mixture thereof.

In other embodiments, the first catalytic region can be substantially free of PGMs other than the PGM (e.g., Pt) nanoparticles. In further embodiments, the first catalytic region can be essentially free of PGMs other than the PGM (e.g., Pt) nanoparticles.

The catalyst article can further comprise a second catalytic region.

The second catalytic region can comprise a second PGM component, a second oxygen storage capacity (OSC) material, a second alkali or alkaline earth metal component, and/or a second inorganic oxide.

The second PGM component can be selected from the group consisting of palladium, platinum, rhodium, and a mixture thereof. In some embodiments, the second PGM component can be Rh when the PGM nanoparticles are Pt.

The second catalytic region can comprise up to 350 $g/ft^3$ of the second PGM component. Preferably, the second catalytic region can comprise 10-300 $g/ft^3$, more preferably, 25-150 $g/ft^3$ of the second PGM component.

The total washcoat loading of the second catalytic region can be from 0.1 to 5 $g/in^3$. Preferably, the total washcoat loading of the second catalytic region is 0.5 to 3.5 $g/in^3$, most preferably, the total washcoat loading of the second catalytic region is 1 to 2.5 $g/in^3$.

The second inorganic oxide is preferably an oxide of Groups 2, 3, 4, 5, 13 and 14 elements. The second inorganic oxide is preferably selected from the group consisting of alumina, magnesia, lanthana, silica, neodymium, praseodymium, yttrium oxides, titania, niobia, tantalum oxides, molybdenum oxides, tungsten oxides, and mixed oxides or composite oxides thereof. More preferably, the second inorganic oxide is selected from the group consisting of alumina, magnesia, silica, lanthanum, neodymium, praseodymium, yttrium oxides, and mixed oxides or composite oxides thereof. Particularly preferably, the second inorganic oxide is alumina, a lanthanum/alumina composite oxide, or a magnesia/alumina composite oxide. One especially preferred second inorganic oxide is a lanthanum/alumina composite oxide. The second inorganic oxide may be a support material for the second PGM component, and/or for the second alkali or alkaline earth metal.

The second inorganic oxides preferably have a fresh surface area of greater than 80 $m^2/g$, pore volumes in the range 0.1 to 4 mL/g. High surface area inorganic oxides having a surface area greater than 100 $m^2/g$ are particularly preferred, e.g. high surface area alumina. Other preferred second inorganic oxides include lanthanum/alumina composite oxides, optionally further comprising a cerium-containing component, e.g. ceria. In such cases the ceria may be present on the surface of the lanthanum/alumina composite oxide, e.g., as a coating.

The second OSC material is preferably selected from the group consisting of cerium oxide, zirconium oxide, a ceria-zirconia mixed oxide, and an alumina-ceria-zirconia mixed oxide. More preferably, the second OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the second OSC material may function as a support material for the second PGM component.

In some embodiments, the second PGM component are supported on the second OSC material and the second inorganic oxide.

The second OSC material (e.g., ceria-zirconia mixed oxide) can be from 10 to 90 wt %, preferably, 25-75 wt %, more preferably, 35-65 wt %, based on the total washcoat loading of the second catalytic region.

The second OSC material loading in the second catalytic region can be less than 1.5 $g/in^3$. In some embodiments, the second OSC material loading in the second catalytic region is no greater than 1.2 $g/in^3$, 1.0 $g/in^3$, 0.9 $g/in^3$, 0.8 $g/in^3$, 0.7 $g/in^3$, or 0.6 $g/in^3$.

The second OSC material and the second inorganic oxide can have a weight ratio of no greater than 10:1, preferably, no greater than 8:1 or 5:1, more preferably, no greater than 4:1 or 3:1, most preferably, no greater than 2:1.

Alternatively, the second OSC material and the second inorganic oxide can have a weight ratio of 10:1 to 1:10, preferably, 8:1 to 1:8 or 5:1 to 1:5; more preferably, 4:1 to 1:4 or 3:1 to 1:3; and most preferably, 2:1 to 1:2.

In some embodiments, the second alkali or alkaline earth metal may be deposited on the second OSC material. Alternatively, or in addition, the second alkali or alkaline earth metal may be deposited on the second inorganic oxide. That is, in some embodiments, the second alkali or alkaline earth metal may be deposited on, i.e. present on, both the second OSC material and the second inorganic oxide.

Preferably the second alkali or alkaline earth metal is supported/deposited on the second inorganic oxide (e.g., alumina). In addition to, or alternatively to, being in contact with the second inorganic oxide, the second alkali or alkaline earth metal may be in contact with the second OSC material and also the second PGM component.

The second alkali or alkaline earth metal is preferably barium or strontium. Preferably the barium or strontium, where present, is present in an amount of 0.1 to 15 weight percent, and more preferably 3 to 10 weight percent, based on the total washcoat loading of the second catalytic region.

Preferably the barium is present as a $BaCO_3$ composite material. Such a material can be performed by any method known in the art, for example incipient wetness impregnation or spray-drying.

In some embodiments, the first PGM component and the second PGM component has a weight ratio of from 60:1 to 1:60. Preferably, the first PGM component and the second PGM component has a weight ratio of from 30:1 to 1:30. More preferably, the first PGM component and the second PGM component has a weight ratio of from 20:1 to 1:20. Most preferably, the first PGM component and the second PGM component has a weight ratio of from 15:1 to 1:15.

The catalyst article of the invention may comprise further components that are known to the skilled person. For example, the compositions of the invention may further comprise at least one binder and/or at least one surfactant. Where a binder is present, dispersible alumina binders are preferred.

Preferably the substrate is a flow-through monolith, or wall flow gasoline particulate filter. More preferably, the substrate is a flow-through monolith.

The flow-through monolith substrate has a first face and a second face defining a longitudinal direction there between. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 900 channels per square inch, preferably from 300 to 750. For example, on the first face, the density of open first channels and closed second channels is from 300 to 750 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

In some embodiments, the first catalytic region is supported/deposited directly on the substrate. In further embodiments, the second catalytic region is supported/deposited on the first catalytic region.

In other embodiments, the second catalytic region is supported/deposited directly on the substrate. In further embodiments, the first catalytic region is supported/deposited on the second catalytic region.

Another aspect of the present disclosure is directed to a method for treating a vehicular exhaust gas containing $NO_x$, CO, and HC using the catalyst article described herein. Catalytic converters equipped with TWC made according to the invention show improved or comparable catalytic performance compared to conventional TWC (e.g., see Systems 2, 4, 6, and 9; and Tables 4-8).

Systems

Another aspect of the present disclosure is directed to a system for treating vehicular exhaust gas comprising the catalyst article described herein in conjunction with a conduit for transferring the exhaust gas through the system.

The catalyst article according to the invention could obviously be used in combination with other exhaust system aftertreatment components to provide a full exhaust system aftertreatment apparatus, according to specific requirements. The exhaust gas can be emitted from a positive ignition internal combustion engine.

Positive ignition internal combustion engines, such as spark ignition internal combustion engines, for use n this aspect of the invention can be fueled by gasoline fuel, gasoline fuel blended with oxygenates including methanol and/or ethanol, liquid petroleum gas or compressed natural gas. Positive ignition engines can be stoichiometrically operated engines or lean-burn operated engines.

The emission treatment system can further comprise a second catalyst article. The second catalyst article can comprise Three-Way Catalyst (TWC) component. The second catalyst article can be upstream or downstream of the catalyst article. The second catalyst article can comprise a substrate; a catalytic region on the substrate; wherein the catalytic region comprises a platinum group metal (PGM) component. The PGM component can be Rh, Pd, Pt or a combination thereof. The second catalyst article can further comprise an inorganic oxide, an oxygen storage capacity (OSC) material, and/or an alkali or alkaline earth metal component.

(I)

As shown in diagram (I) above, the second catalyst article can be upstream of the catalyst article of the present invention. The second catalyst article can be in a close-coupled position. The catalyst article described in the first aspect of the present invention can be in an under-floor position with the distance of 40-100 cm, preferably 60-80 cm downstream from the close-coupled position (e.g., the second catalyst article).

The PGM loading ratio between the second catalyst article and the catalyst article can be from 300:1 to 1:1; preferably, 250:1 to 5:1; or more preferably, 250:1 to 10:1.

The PGM amount between the second catalyst article and the catalyst article can be from 600:1 to 1:5; preferably, 500:1 to 1:1; or more preferably, 500:1 to 2:1.

(II)

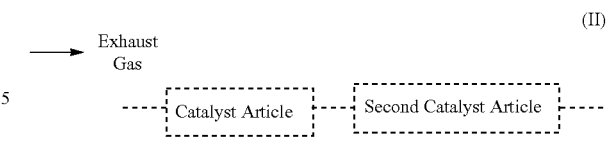

Alternatively, as shown in diagram (II) above, the second catalyst article can be downstream of the catalyst article of the present invention. The second catalyst article can be in an under-floor position. The catalyst article described in the first aspect of the present invention can be in a close-coupled position with the distance of 40-100 cm, preferably 60-80 cm upstream from the under-floor position (e.g., the second catalyst article).

The PGM loading ratio between the second catalyst article and the catalyst article can be from 300:1 to 1:1; preferably, 250:1 to 5:1; or more preferably, 250:1 to 10:1.

The PGM amount between the second catalyst article and the catalyst article can be from 600:1 to 1:5; preferably, 500:1 to 1:1; or more preferably, 500:1 to 2:1.

The PGM loading in the upstream Catalyst Article of the present invention can be lower than the PGM loading of the second catalyst article in the downstream. Preferably, the PGM loading ratio between the second catalyst article and the catalyst article can be at least 2:1; more preferably, at least 10:1; or even more preferably, at least 100:1.

The total PGM amount in the upstream Catalyst Article of the present invention can be lower than the PGM amount of the second catalyst article in the downstream. Preferably, the total PGM amount ratio between the second catalyst article and the catalyst article can be at least 4:1; preferably 20:1; or more preferably 200:1.

The emission treatment system can further comprise a GPF, a hydrocarbon trap, a $NO_x$ trap, a lean $NO_x$ trap, a SCR catalyst, an electrically heat catalyst, or a combination thereof.

According to another aspect, the invention provides a method of maintaining simultaneous conversion of carbon monoxide, hydrocarbons, oxides of nitrogen of and particulate matter in exhaust gas comprising one or more catalyst poison emitted from a positive ignition internal combustion engine using the catalyst article according to the first aspect of the present invention, or using the emission treatment system as describe above.

DEFINITIONS

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Jr and Pt, preferably a metal selected from the group consisting of Ru, Rh, Pd, Jr and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The term "atomically resolved" as used herein refers to "atomically precise synthesized" nanoparticle cluster materials with narrow distribution of +/−10 atoms, preferably +/−5 atoms, more preferably +/−2 atoms. The atomically resolved clusters can be obtained typically two processes. One is tuning the experimental conditions (e.g. solvent, organic ligands, temperature, pH . . . ) where the target cluster is chemically extremely stable compared to the other size of the clusters. Another process is size-selection of the target cluster typically using chromatography, electrophoresis, or mass spectrometry.

The "TEM" is a method for the particle size measurement as used herein. High angle annular dark filed scanning transmission electron microscopy images were recorded using a JEOL ARM200CFE fitted with an aberration corrector. The catalyst powders of $Pt/Al_2O_3$ were ground between two glass slides and dusted onto a holey carbon coated Cu TEM grid.

The "CO-pulse" is a method for the particle size measurement as used herein. CO-pulse adsorption experiments were performed at 50° C., followed by pre-adsorption of $CO_2$ to quench the CO uptake site by $Al_2O_3$ support, by using a metal dispersion analyzer (BEL-METAL, Microtrac-BEL). The catalyst samples were pretreated by 10% $O_2$/He gas at 600° C. for 20 min and subsequent 3% $H_2$/He gas at 300° C. for 10 min, before the measurement.

The "mean particle size" estimated by TEM means the mean diameter of the particle with the assumption that a sphere shape of the Pt particles is supported on the oxide materials. The diameter (2R) can be calculated as follows;

$2R = 2\sqrt{A/\pi}$ where A is the area of the particle measured by TEM.

The "mean particle size" estimated by CO-pulse means the mean diameter of the particle with the assumption that a sphere shape of the Pt particles is supported on the oxide materials. The mean particle size can be calculated with the data of Pt metal dispersion, which is representing the ratio of the surface atoms to total atoms, and volumetric mass density of the corresponding Pt bulk materials.

The "MALDI" is a method to ionize the synthesized nanoparticle cluster materials for mass spectrometry based on matrix-assisted laser desorption and ionization technique. MALDI mass spectra were collected by a spiral time-of-flight mass spectrometer (JEOL, JMSS3000) with a semiconductor laser. DCTB63 was used as the MALDI matrix. To minimize dissociation of the cluster caused by laser irradiation, we used a cluster-to-matrix ratio of 1:1000.

The "IR spectroscopy" is a method for the vibrational frequency measurement of CO adsorbed on Pt nanoparticle clusters as used herein. Diffuse Reflectance Infrared Fourier Transform Spectroscopy was carried out under a flow of 1% CO/He, using a FTIR spectrometer of FT/IR-6600 FV (JASCO) with MCT detector. The spectra were recorded with the sample at 100° C., 200° C., 300° C. and 400° C. The catalyst samples were pretreated by 10% $O_2$/He gas at 600° C. for 20 min and subsequent 3% $H_2$/He gas at 300° C. for 10 min, before the measurement.

The "hydrothermal ageing" is a method to reproduce the deterioration state of a catalyst used in actual applications. The samples were set in an electric furnace where mixture of steam and alternating reducing/oxidation gasses shown in Table 1 are introduced.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

Example 1: Pt Cluster of Atomically Resolved 17 Atoms on Alumina

The Pt cluster protected by triphenylphosphine (TPP) was synthesized according to the flow shown in FIG. 1 and *J. Phys. Chem. C* 2017, 11002-11009.

Figure 2:
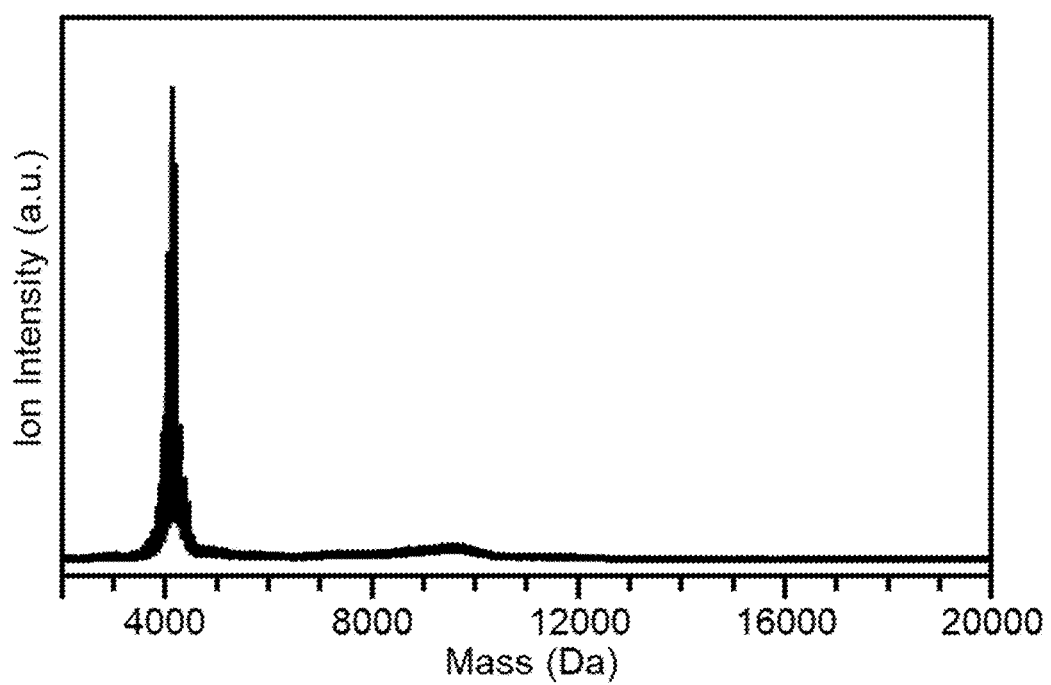
FIG. 2 shows an example of MALDI mass spectrum of synthesized TPP-protected platinum cluster.

$H_2PtCl_6 \cdot 6H_2O$ (0.1 mmol) and NaOH (~2 mmol) were dissolved in ethylene glycol (25 mL). NaOH was used to control the pH of the solution and thereby suppress the particle size obtained by the polyol reduction. The mixture was heated at 120° C. for 10 min to reduce Pt ions and produce CO catalyzed by Pt. After the solution cooled to room temperature (25° C.), acetone (10 mL) containing TPP (0.5245 g, 2 mmol) was added to this solution at once. After several minutes, toluene (~20 mL) and water (~20 mL) were added to the reaction solution. The Pt clusters were transferred into the organic phase. Then, the organic phase was separated from the water phase and dried with a rotary evaporator. The dried product was washed with water and then methanol to eliminate ethylene glycol and excess TPP. The mass number of the platinum cluster was confirmed by using matrix assisted laser desorption ionization (MALDI) mass spectrometry as shown in FIG. 2.

The dried product of Pt cluster of atomically resolved 17 atoms, whose content is more than 70% of total Pt nanoparticle cluster, was dissolved in toluene solution and then an alumina powder was mixed into the solution. The toluene solvent was then removed with a rotary evaporator. The dried Pt/alumina powder was heated to 500° C. under vacuum condition to remove TPP ligand and then calcined at 600° C. for 2 hours in static oven under atmosphere.

Examples 2A to 2D: Pt Cluster of 35 to 71 Atoms on Alumina

Figure 3:
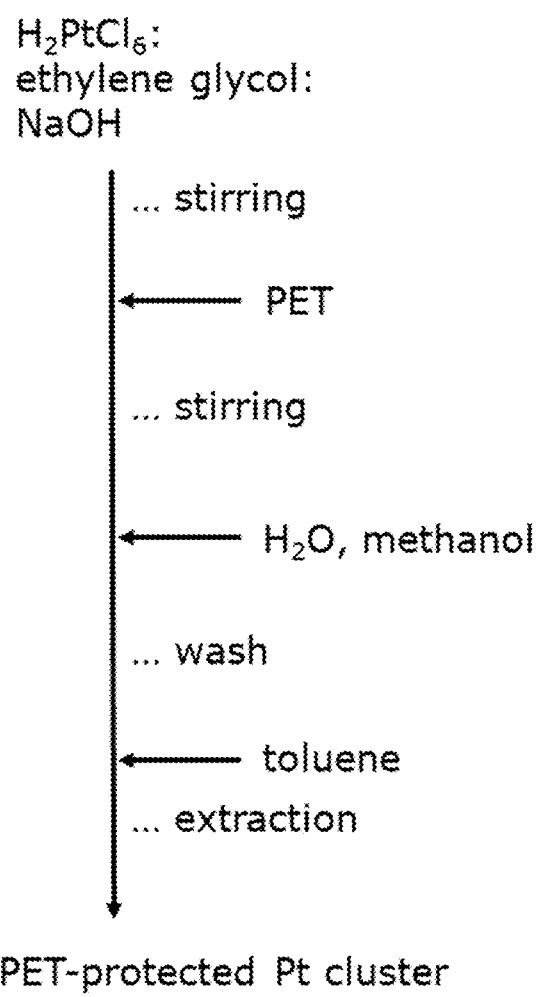
FIG. 3 shows a flow diagram to synthesis phenyl ethanethiol (PET)-protected Pt cluster.
Figure 4:
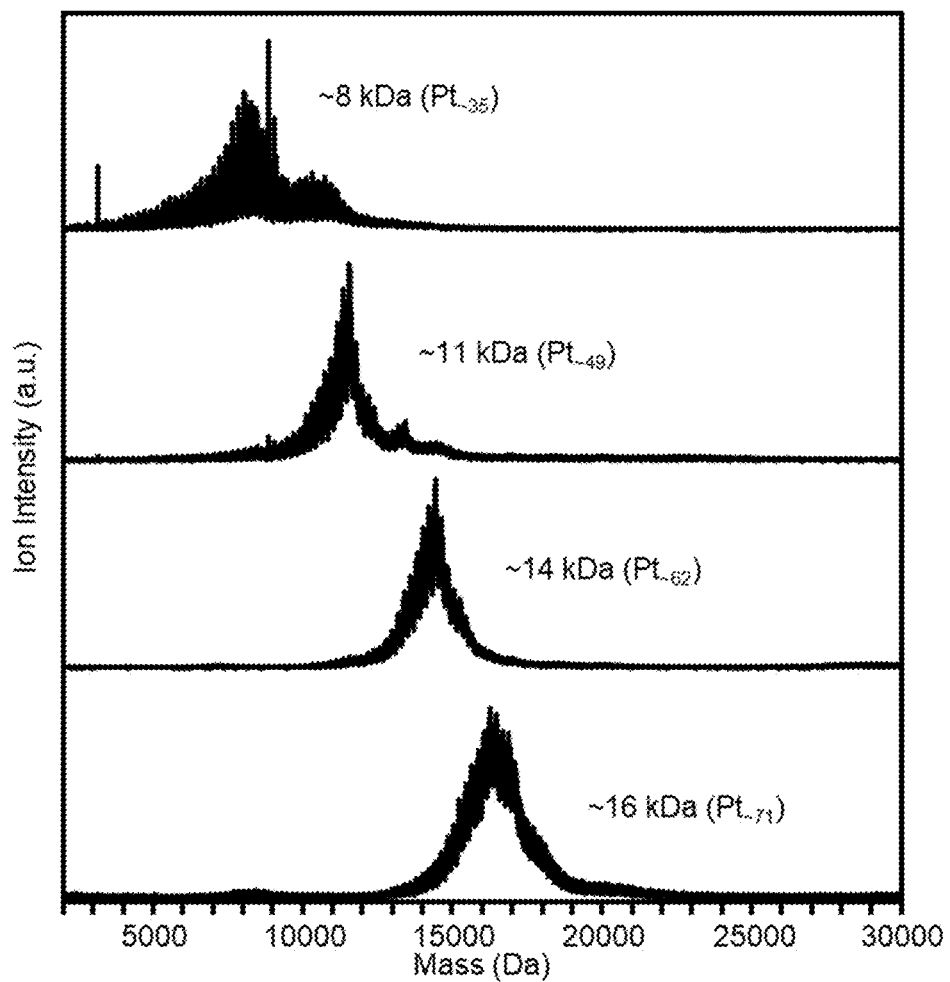
FIG. 4 shows an example of MALDI mass spectrum of synthesized PET-protected platinum cluster (Examples 2A-2D).

The platinum cluster was synthesized by using the polyol reduction method whose flow is shown in FIG. 3. First, by using an organic synthesizer, chloroplatinic acid and sodium hydroxide were dissolved in of ethylene glycol and adjusted to a predetermined pH. The mass number of the platinum cluster was varied by changing the pH, temperature and reaction time. After reaction, the protecting ligand of phenylethanethiol (PET) toluene solution was added and then the mixture was washed with water and methanol, and the synthesized platinum cluster was extracted into toluene to obtain a target platinum cluster. The mass number of the platinum cluster was confirmed by using MALDI mass spectrometry as shown in FIG. 4.

Example 2A is the product of Pt cluster of 35 atoms with the distribution of +/−5 atoms at full-width half-maximum, dissolved in toluene solution was mixed with an alumina powder. The toluene solvent was then removed with a rotary evaporator. The dried Pt/alumina powder was heated to 500° C. under vacuum condition to remove PET ligand and then calcined at 600° C. for 2 hours in static oven under atmosphere.

Example 2B is the product of Pt cluster of 49 atoms with the distribution of +/−5 atoms at full-width half-maximum, dissolved in toluene solution was mixed with an alumina powder. The toluene solvent was then removed with a rotary evaporator. The dried Pt/alumina powder was heated to 500° C. under vacuum condition to remove PET ligand and then calcined at 600° C. for 2 hours in static oven under atmosphere.

Example 2C is the product of Pt cluster of 62 atoms with the distribution of +/−5 atoms at full-width half-maximum, dissolved in toluene solution was mixed with an alumina powder. The toluene solvent was then removed with a rotary evaporator. The dried Pt/alumina powder was heated to 500° C. under vacuum condition to remove PET ligand and then calcined at 600° C. for 2 hours in static oven under atmosphere.

Example 2D is the product of Pt cluster of 71 atoms with the distribution of +/−5 atoms at full-width half-maximum, dissolved in toluene solution was mixed with an alumina powder. The toluene solvent was then removed with a rotary evaporator. The dried Pt/alumina powder was heated to 500° C. under vacuum condition to remove PET ligand and then calcined at 600° C. for 2 hours in static oven under atmosphere.

Comparative Example 3: Pt-Supporting Alumina Synthesized by an Impregnation Method A platinum aqueous solution was impregnated into the alumina powder, and then dried in air at 150° C. for 2 hours. The dried powder was calcined at 600° C. for 2 hours.

Example 4: A Hydrothermal Aged Substance Originally Having a Platinum Cluster of Atomically Resolved 17 Atoms on Alumina The Pt cluster supported on alumina in Example 1 was aged under hydrothermal redox condition shown in Table 1. The ageing temperature was 1000° C. and the duration was 4 hours.

TABLE 1

| Condition | CO (%) | $H_2$ (%) | $O_2$ (%) | $H_2O$ (%) | $N_2$ | Duration |
|---|---|---|---|---|---|---|
| Reducing | 3 | 3 | 0 | 10 | balance | 3 min |
| Oxidizing | 0 | 0 | 3 | 10 | balance | 3 min |

Example 5: A Hydrothermal Aged Substance Originally Having a Platinum Cluster of Around 62 Atoms on Alumina The Pt cluster supported alumina in Example 2 was aged under hydrothermal redox condition shown in Table 1. The ageing temperature was 1000° C. and the duration was 4 hours.

Comparative Example 6: A Hydrothermal Aged Pt-Supporting Alumina Originally Synthesized by an Impregnation Method The Pt cluster supported alumina of Comparative Example 3 was aged under hydrothermal redox condition shown in Table 1. The ageing temperature was 1000° C. and the duration was 4 hours.

Geometric Structure of Pt Nanoparticle Clusters by TEM

Figure 5:
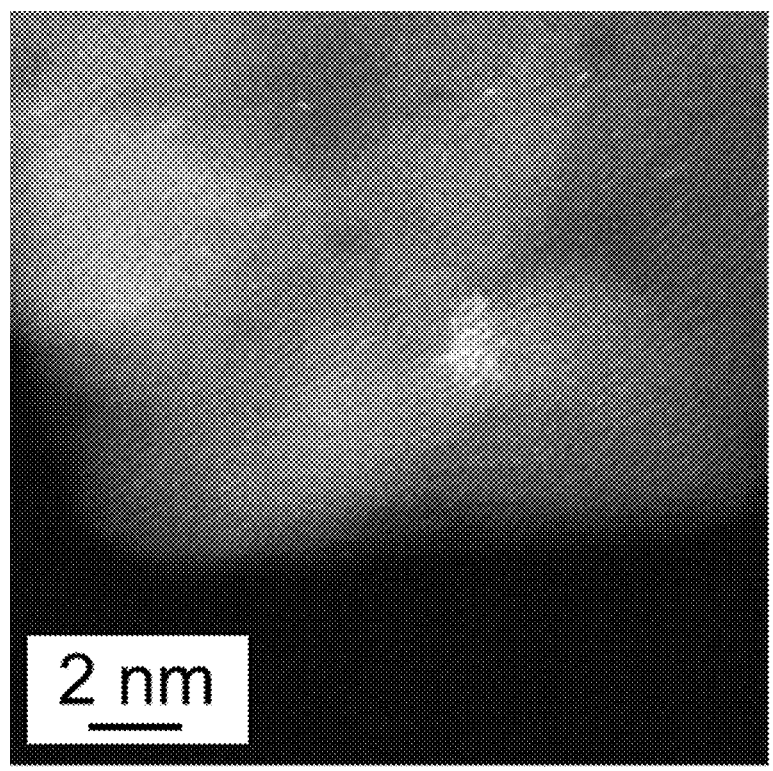
FIG. 5 shows an electron micrograph of a substance having a platinum cluster of 17 atoms (4.2 kDa) whose content is more than 70% of total Pt nanoparticle cluster on alumina according to Example 1.
Figure 6:
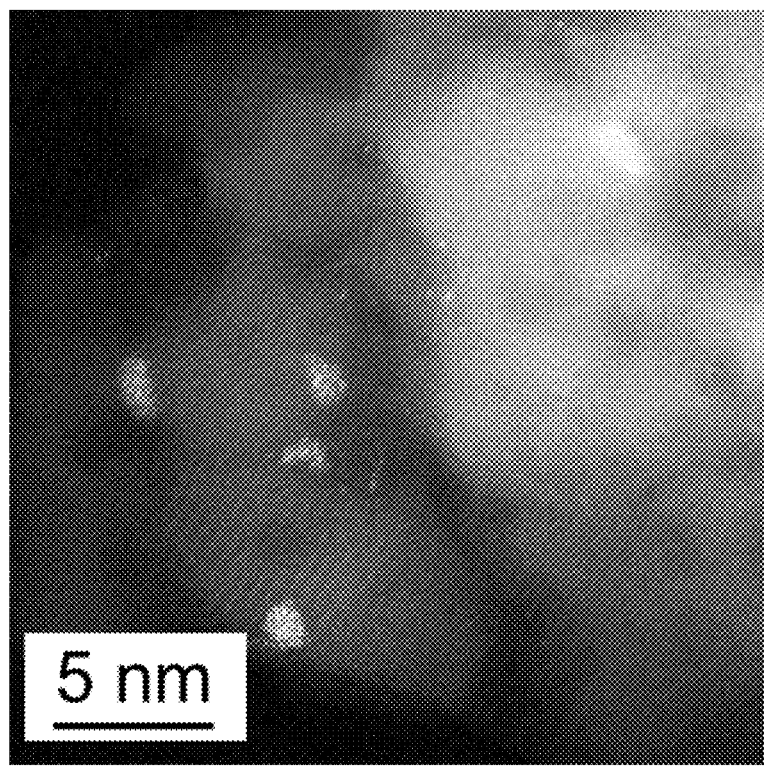
FIG. 6 shows an electron micrograph of a substance having a platinum cluster of 62 atoms (14 kDa) with the distribution of +/−5 atoms at full-width half-maximum on alumina according to Example 2C.

The examples and the comparative examples were observed by using a scanning transmission electron microscope (ARM 200 CFE: manufactured by JEOL Ltd). As shown in FIGS. 5 and 6, platinum clusters with non-fcc-type geometric structure was observed on alumina in Examples 1 and 2C. The mean particle size and the standard deviation (SD) were listed in Table 2. The mean particle size was very small, which is below 1.5 nm and very narrow size distribution was observed, within 0.5 nm at SD.

TABLE 2

| Sample | Mean Particle Size (nm) | Standard Deviation (nm) |
|---|---|---|
| Example 1 ($Pt_{17}$ cluster) | 1.07 | +/−0.24 |
| Example 2C ($Pt_{62}$ cluster) | 1.28 | +/−0.43 |
| Comparative Example 3 (Pt impreg.) | 3.10 | +/−3.14 |

Figure 7:
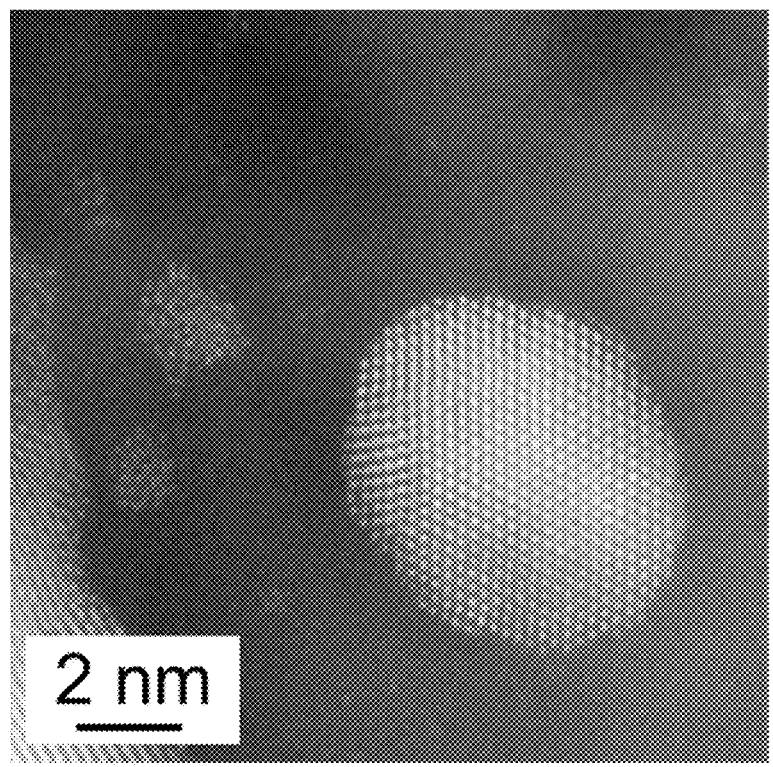
FIG. 7 shows an electron micrograph of platinum supported on alumina synthesized by an impregnation method utilizing a platinum salt aqueous solution according to Comparative Example 3.

On the other hand, as shown in FIG. 7, in Comparative Example 3, platinum particles in a fcc-based crystalline form of about 5 nm to 10 nm were observed on alumina. It is considered that this platinum particle in a crystalline form is composed of 1000 to 10000 platinum atoms. As is clear from comparison between FIGS. 3 and 4, the atomic arrangement of Pt nanoparticles supported on the alumina is quite different between the substance according to the examples and the substance according to the comparative example.

IR Spectroscopic Measurement of Adsorbed CO on Pt Nanoparticle Clusters

IR spectroscopic measurement of adsorbed CO was performed by using an infrared spectrometer (FT/IR-6600 FV: manufactured by JASCO Corporation) to identify the unique properties of non-fcc type Pt cluster materials, which are different from those of the corresponding bulk (fcc-type) nanoparticles. In the adsorbed CO-FTIR measurement, the substances according to the examples and the comparative example were placed in the reaction cell of the infrared spectrometer, and the IR spectrum of CO adsorbed by platinum was measured while introducing CO gas into the reaction cell.

Figure 8:
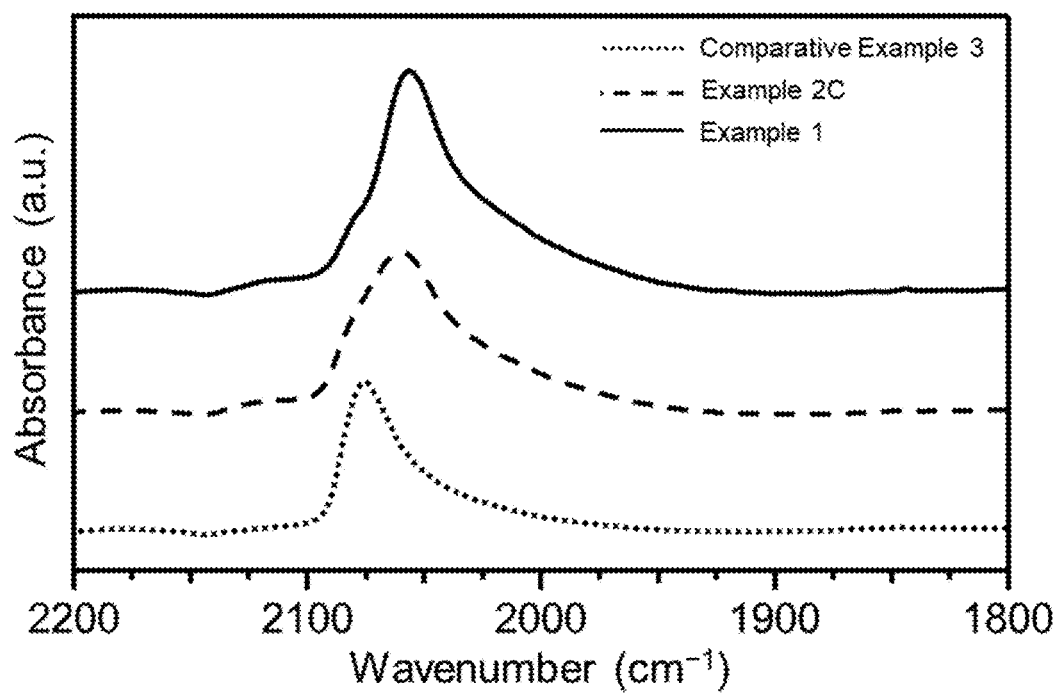
FIG. 8 shows a graph showing the infrared absorption signals of the adsorbed CO on Examples 1 and 2C, and Comparative Example 3 at 300° C.

FIG. 8 shows IR absorption spectra for Examples 1 and 2C, and Comparative Example 3 at the temperature of 300° C. The strong IR absorption signals assignable to a-top CO state were observed for examples and comparative example while the peak position for the examples was lower wavenumber (vibration frequency), a finding which is indicting that adsorbed CO is more activated through string chemical interaction with Pt of the examples as respect to that of the comparative example.

Figure 9:
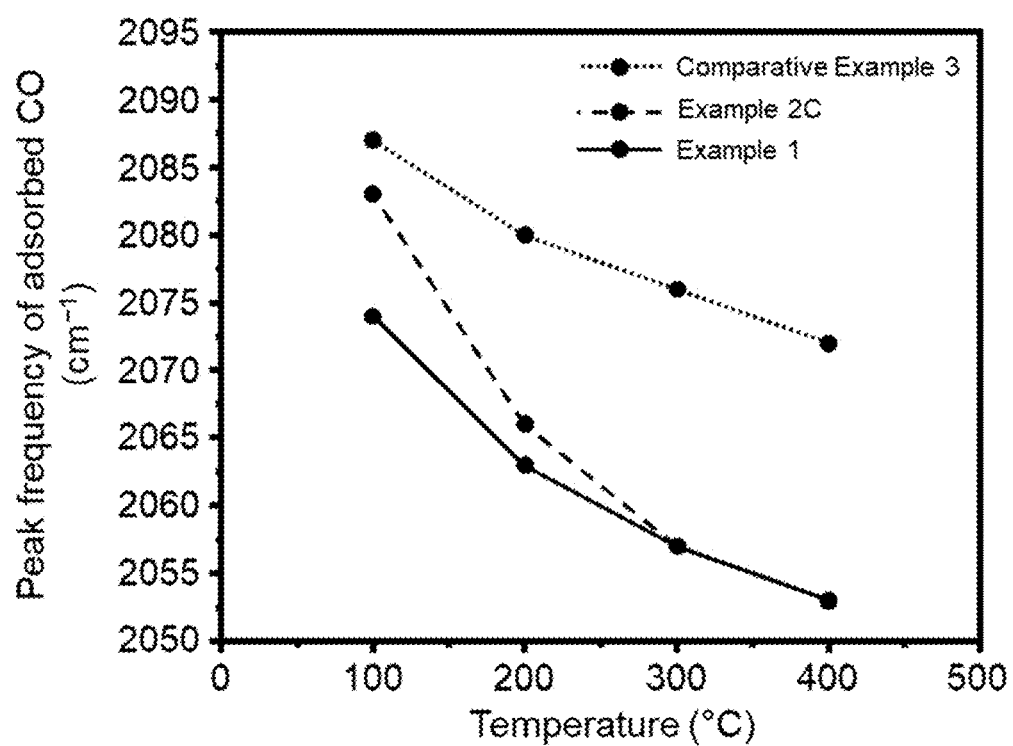
FIG. 9 shows a graph showing the relationship between the vibration frequency of the adsorbed CO and temperature for Examples 1 and 2C, and Comparative Example 3.

FIG. 9 shows the relationship between the vibration frequency of the adsorbed CO on Pt nanoparticles of Examples 1 and 2C, and Comparative Example 3 and the temperature obtained by the IR measurement. Here, the vibration frequency of the adsorbed CO refers to the wavenumber of CO at which the strongest peak is observed in the IR spectra obtained at each temperature, and in FIG. 9, the lower vibration frequency of the adsorbed CO means more activation of the adsorbed CO on the Pt nanoparticles. As shown in FIG. 9, in the material according to the examples, the adsorbed CO was activated more at a lower temperature. Also, surprisingly, the vibration frequencies of the adsorbed CO at 200° C. of the substance according to Examples 1 and 2C are smaller than that of the adsorbed CO at 400° C. of the substance according to Comparative Example 3.

Toughness Toward Harsh Hydrothermal Ageing Treatment

Figure 10:
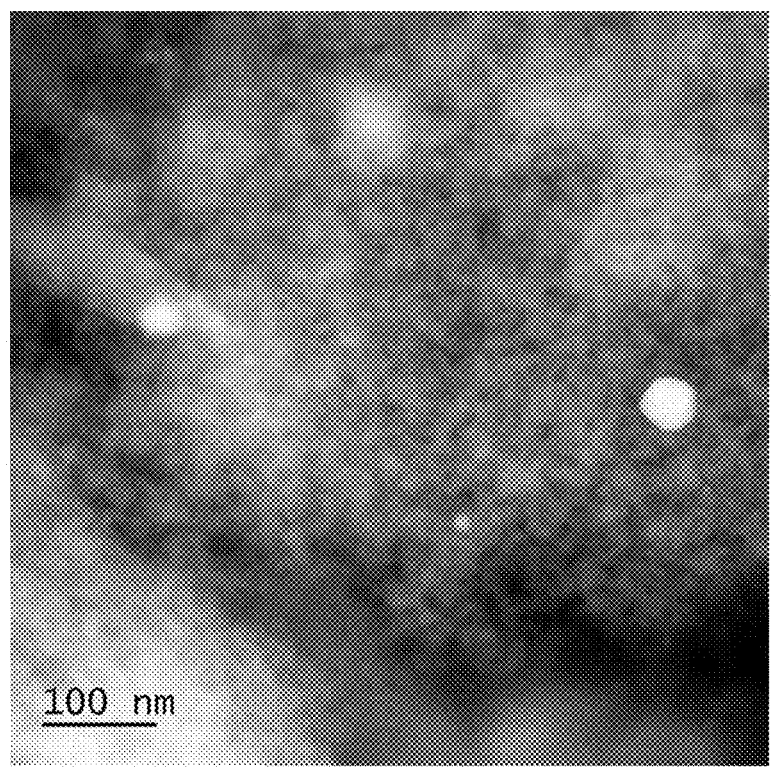
FIG. 10 shows an electron micrograph of a hydrothermal redox aged substance originally having a platinum cluster of around 17 atoms on alumina according to Example 4.
Figure 11:
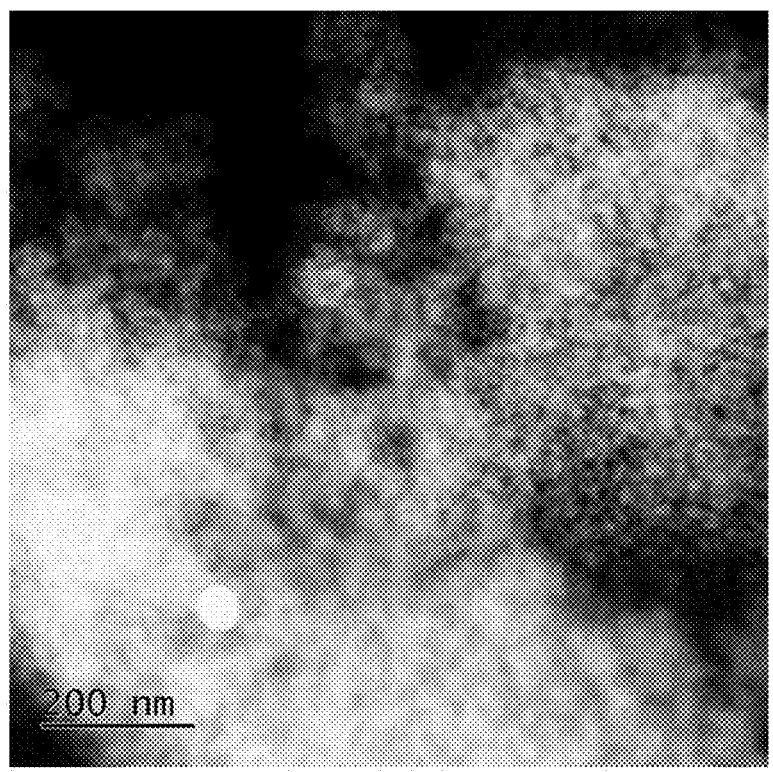
FIG. 11 shows an electron micrograph of a hydrothermal redox aged substance originally having a platinum cluster of around 62 atoms (14 kDa) on alumina according to Example 5.
Figure 12:
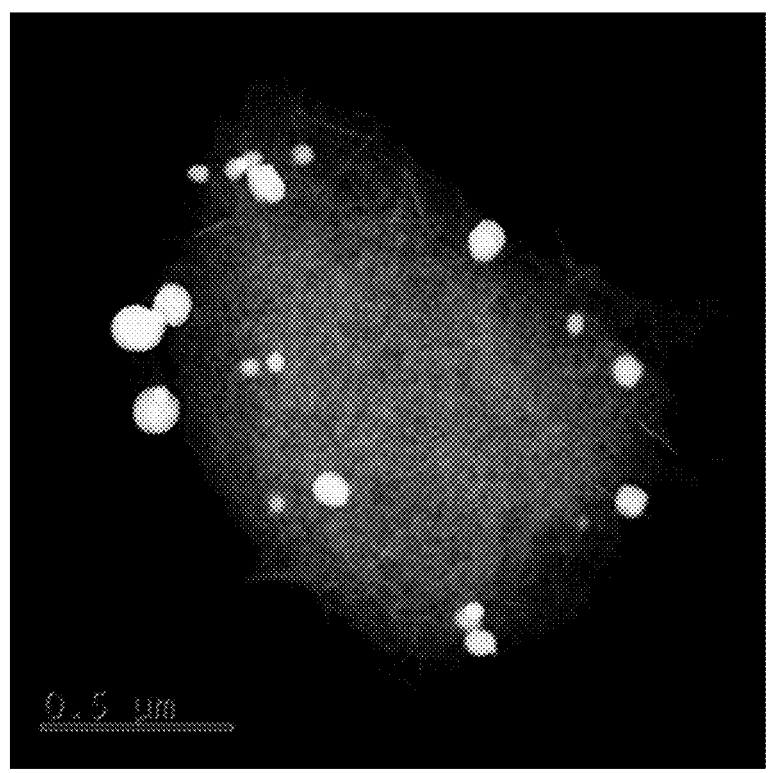
FIG. 12 shows an electron micrograph of a hydrothermal redox aged substance of platinum-supporting alumina originally synthesized by an impregnation method utilizing a platinum salt aqueous solution according to Comparative Example 6.

Examples 4 and 5, and Comparative Example 6 were observed by TEM and the results are shown in FIGS. 10-12. The Pt nanoparticles were aggregated and sintered after the ageing treatment to be larger particle size. The mean particle size and the SD were listed in Table 3. The mean particle size was smallest for Example 4 with 25.3 nm diameter while the mean particle size for Example 5 and Comparative Example 6 were about three times larger than that of Example 4. The results evidently indicate that the Pt catalyst with the non-fcc type cluster of around 17 atoms of Pt has a superior property of thermostability during harsh ageing likely due to unexpected strong interaction with alumina carrier surface.

TABLE 3

| Sample | Mean Particle Size (nm) | Standard Deviation (nm) |
| --- | --- | --- |
| Example 4 | 25.3 | +/−19.4 |
| Example 5 | 71 | +/−30.2 |
| Comparative Example 6 | 77.5 | +/−29.9 |

Catalyst 1 (Comparative)

Catalyst 1 is a three-way catalyst with a single-layered structure on a flow through monolith substrate. The catalyst layer consists of Pt supported on a washcoat of a CeZr mixed oxide, La-stabilized alumina through the impregnation of Pt salt solution. The washcoat loading of the layer was about 1.8 g/in$^3$ with a Pt loading of 12 g/ft$^3$.

Catalyst 2

Catalyst 2 was prepared according to the present invention, with a single-layered structure on a flow through monolith substrate. The catalyst layer consists of Pt cluster (~62 atoms) supported on a washcoat of a CeZr mixed oxide, La-stabilized alumina. The washcoat loading of the layer was about 1.8 g/in$^3$ with a Pt loading of 12 g/ft$^3$.

Catalyst 3 (Comparative)

Catalyst 3 is a three-way catalyst with a single-layered structure on a flow through monolith substrate. The catalyst layer consists of Pt supported on a washcoat of a CeZr mixed oxide, La-stabilized alumina through the impregnation of Pt salt solution. The washcoat loading of the layer was about 1.0 g/in$^3$ with a Pt loading of 0.5 g/ft$^3$.

Catalyst 4

Catalyst 4 was prepared according to the present invention, with a single-layered structure on a flow through monolith substrate. The catalyst layer consists of Pt cluster (~17 atoms) supported on a washcoat of a CeZr mixed oxide, La-stabilized alumina. The washcoat loading of the layer was about 1.0 g/in$^3$ with a Pt loading of 0.5 g/ft$^3$.

Catalyst 5 (Comparative)

Catalyst 5 is a three-way catalyst with a double-layered structure on a flow through monolith substrate. The bottom layer consists of Pd supported on a washcoat of a CeZr mixed oxide, La-stabilized alumina, and Ba promotor. The washcoat loading of the bottom layer was about 1.4 g/in$^3$ with a Pd loading of 100 g/ft$^3$. The top layer consists of Rh supported on a washcoat of a second CeZr mixed oxide and La-stabilized alumina. The washcoat lading of the top layer was about 1.4 g/in$^3$ with a Rh loading of 20 g/ft$^3$. The total washcoat loading of Catalyst 5 was about 2.8 g/in$^3$.

Second Catalyst Article 1

Second Catalyst Article 1 is a three-way (Pd—Rh) catalyst with a double-layered structure on a flow through monolith substrate. The bottom layer consists of Pd supported on a washcoat of a first CeZr mixed oxide, La-stabilized alumina with 8 wt %, Ba promotor. The washcoat loading of the bottom layer was about 1.7 g/in$^3$ with a Pd loading of 120 g/ft$^3$. The top layer consists of Rh supported on a washcoat of a second CeZr mixed oxide, La-stabilized alumina. The washcoat loading of the top layer was about 1.5 g/in$^3$ with a Rh loading of 20 g/ft$^3$. The total washcoat loading of Second Catalyst Article 1 was about 3.2 g/in$^3$.

Second Catalyst Article 2

Second Catalyst Article 2 is a three-way catalyst with a double-layered structure on a flow through monolith substrate. The bottom layer consists of Pd supported on a washcoat of a CeZr mixed oxide, La-stabilized alumina, and Ba promotor. The washcoat loading of the bottom layer was about 1.4 g/in$^3$ with a Pd loading of 100 g/ft$^3$. The top layer consists of Rh supported on a washcoat of a second CeZr mixed oxide and La-stabilized alumina. The washcoat lading of the top layer was about 1.4 g/in$^3$ with a Rh loading of 20 g/ft$^3$. The total washcoat loading of Second Catalyst Article 2 was about 2.8 g/in$^3$.

Experimental Results

System 1 (Comparative)

Second Catalyst Article 1 and Comparative Catalyst 1 were bench aged with fuel cut aging cycles using naturally aspirated 1.8 L 4 cylinder in-line gasoline engine, with peak temperature at 950° C. for 200 hours for Second Catalyst Article 1 and 850° C. for 50 hours for Comparative Catalyst 1. Vehicle emissions were conducted over a commercial vehicle with 2.5 litre engine, where Second Catalyst Article 1 was upstream and mounted at closed-couple position and Comparative Catalyst 1 was positioned at under-floor. The substrates for Second Catalyst Article 1 and Comparative Catalyst 1 have the same volume. Emissions were measured pre- and post-catalyst on LA-4 modal test (city cycle, US federal and California).

System 2

Second Catalyst Article1 and Catalyst 2 were bench aged with fuel cut aging cycles using naturally aspirated 1.8 L 4 cylinder in-line gasoline engine, with peak temperature at 950° C. for 200 hours for the Second Catalyst Article 1 and 850° C. for 50 hours for Catalyst 2. Vehicle emissions were conducted over a commercial vehicle with 2.5 litre engine, where Second Catalyst Article 1 was mounted at closed-couple position and Catalyst 2 was positioned at under-floor. The substrates for Second Catalyst Article 1 and Catalyst 2 have the same volume. Emissions were measured pre- and post-catalyst on LA-4 modal test (city cycle, US federal and California).

TABLE 4

Catalysts Performance by Bag Emission Analysis

| | Weighted Tailpipe Emissions (g/km) | | | |
|---|---|---|---|---|
| | HC | NMHC | CO/10 | $NO_x$ |
| System 1 (Comparative) | 0.0184 | 0.0126 | 0.0424 | 0.0260 |
| System 2 | 0.0169 | 0.0109 | 0.0397 | 0.0240 |

As shown in Table 4, Catalyst 2 showed improved performance on emission reduction of HC, NMHC, CO and $NO_x$ in System 2 when compared with Comparative Catalyst 1 in System 1, at under-floor position.

System 3 (Comparative)

Second Catalyst Article 2 and Comparative Catalyst 3 were bench aged with fuel cut aging cycles using 4.6 L gasoline engine, with peak temperature at 940° C. for 50 hours for Second Catalyst Article 2 and 820° C. for 50 hours for Comparative Catalyst 3. Vehicle emissions were conducted over a commercial vehicle with 2.5 litre engine, where Second Catalyst Article 2 was upstream and mounted at closed-couple position and Comparative Catalyst 3 was positioned at under-floor. The substrates for Second Catalyst Article 2 and Comparative Catalyst 3 have the same volume. Emissions were measured pre- and post-catalyst on WLTC (Worldwide Light duty Test Cycle) and US06 highway cycle, US federal and California).

System 4

Second Catalyst Article 2 and Catalyst 4 were bench aged with fuel cut aging cycles using 4.6 L gasoline engine, with peak temperature at 940° C. for 50 hours for Second Catalyst Article 2 and 820° C. for 50 hours for Catalyst 4. Vehicle emissions were conducted over a commercial vehicle with 2.5 litre engine, where Second Catalyst Article 2 was upstream and mounted at closed-couple position and Catalyst 4 was positioned at under-floor. The substrates for Second Catalyst Article 2 and Catalyst 4 have the same volume. Emissions were measured pre- and post-catalyst on WLTC (Worldwide Light duty Test Cycle) and US06 highway cycle, US federal and California).

TABLE 5

Catalyst Performance on WLTC mode

| | Tailpipe Emissions (g) | | |
|---|---|---|---|
| | THC | CO | $NO_x$ |
| System 3 (Comparative) | 0.29 | 17.22 | 1.37 |
| System 4 | 0.27 | 15.5 | 1.40 |

TABLE 6

Catalyst Conversion at under-floor on US06 mode

| | Conversion (%) | | |
|---|---|---|---|
| | THC | CO | $NO_x$ |
| System 3 (Comparative) | 21.3 | 8.8 | 15.0 |
| System 4 | 24.3 | 11.4 | 15.0 |

As shown in Tables 5 and 6, Catalyst 4 showed improved performance on emission reduction especially for HC and CO in System 4 when compared with Comparative Catalyst 3 in System 3, at under-floor position.

System 5 (Comparative)

Comparative Catalyst 3 was bench aged with fuel cut aging cycles using 4.6 L gasoline engine, with peak temperature at 820° C. for 50 hours. Vehicle emissions were conducted over a commercial vehicle with 2.5 litre engine, where Comparative Catalyst 3 mounted at closed-couple position. Emissions were measured pre- and post-catalyst on WLTC (Worldwide Light duty Test Cycle).

System 6

Catalyst 4 was bench aged with fuel cut aging cycles using 4.6 L gasoline engine, with peak temperature at 820° C. for 50 hours. Vehicle emissions were conducted over a commercial vehicle with 2.5 litre engine, where Catalyst 4 mounted at closed-couple position. Emissions were measured pre- and post-catalyst on WLTC (Worldwide Light duty Test Cycle).

System 7 (Comparative)

Comparative Catalyst 5 was bench aged with fuel cut aging cycles using 4.6 L gasoline engine, with peak temperature at 930° C. for 50 hours. Vehicle emissions were conducted over a commercial vehicle with 2.5 litre engine, where Comparative Catalyst 5 mounted at closed-couple position. Emissions were measured pre- and post-catalyst on WLTC (Worldwide Light duty Test Cycle).

TABLE 7

Catalyst Performance on WLTC mode

| | Tailpipe Emissions (g) | | |
|---|---|---|---|
| | THC | CO | $NO_x$ |
| System 5 (Comparative) | 1.82 | 15.69 | 6.83 |
| System 6 | 0.22 | 9.43 | 1.93 |
| System 7 (Comparative) | 0.32 | 17.17 | 2.45 |

As shown in Table 7, Catalyst 4 showed improved performance on emission reduction of HC, CO and $NO_x$ in System 6 when compared with Comparative Catalyst 3 in System 5. Especially for THC, the emission of almost 1/10 was achieved with Catalyst 3 using Pt cluster (~17 atoms) compared to that with Comparative Catalyst 3, at closed-couple position.

Furthermore, Catalyst 4 showed better emission control performance when compared with Comparative Catalyst 5 in System 7, where total PGM loading (100 g/ft³ Pd and 20 g/ft³ Rh) is more than 200 times higher as respect to the PGM loading (0.5 g/ft³ Pt) in Catalyst 4 in System 6.

Therefore, this invention has a great potential to drastically reduce PGM loading in TWC to save the precious metal resources as well as to reduce the cost of the product drastically in TWC market.

System 8 (Comparative)

Comparative Catalyst 3 and Second Catalyst Article 2 were bench aged with fuel cut aging cycles using 4.6 L gasoline engine, with peak temperature at 820° C. for 50 hours for Comparative Catalyst 3 and 940° C. for 50 hours for Second Catalyst Article 2. Vehicle emissions were conducted over a commercial vehicle with 2.5 litre engine, where Comparative Catalyst 3 was upstream and mounted at closed-couple position and Second Catalyst Article 2 was positioned at under-floor. The substrates for Second Catalyst Article 2 and Comparative Catalyst 3 have the same volume. Emissions were measured pre- and post-catalyst on WLTC (Worldwide Light duty Test Cycle) and US06 highway cycle, US federal and California).

System 9

Catalyst 4 and Second Catalyst Article 2 were bench aged with fuel cut aging cycles using 4.6 L gasoline engine, with peak temperature at 820° C. for 50 hours for Catalyst 4 and 940° C. for 50 hours for Second Catalyst Article 2. Vehicle emissions were conducted over a commercial vehicle with 2.5 litre engine, where Catalyst 4 was upstream and mounted at closed-couple position and Second Catalyst Article 2 was positioned at under-floor. The substrates for Second Catalyst Article 2 and Catalyst 4 have the same volume. Emissions were measured pre- and post-catalyst on WLTC (Worldwide Light duty Test Cycle) and US06 highway cycle, US federal and California).

TABLE 8

Catalyst Performance on WLTC mode

| | Tailpipe Emissions (g) | | |
|---|---|---|---|
| | THC | CO | $NO_x$ |
| System 3 (Comparative) | 0.29 | 17.22 | 1.37 |
| System 4 | 0.27 | 15.5 | 1.40 |
| System 8 (Comparative) | 0.73 | 6.28 | 0.77 |
| System 9 | 0.19 | 5.89 | 0.49 |

As shown in Table 8, System 9 showed the best performance on emission reduction of HC, CO and $NO_x$, where lower PGM (0.5 g/ft$^3$ total) loaded in the upstream catalyst with Pt cluster (~17 atoms) and higher PGM (120 g/ft$^3$ total) loaded in the downstream catalyst.

While catalyst system in TWC has been used higher PGM loading in the upstream (e.g., closed couple) and lower PGM loading in the downstream (e.g., under-floor), this invention generated novel system of TWC with lower PGM loading with the cluster material in the upstream and higher PGM loading in the downstream.

I claim:

1. A catalyst article for treating exhaust gas comprising:
a substrate; and
a first catalytic region on the substrate;
wherein the first catalytic region comprises a first platinum group metal (PGM) component and a first inorganic oxide, wherein the first PGM component comprises PGM nanoparticles, wherein the PGM nanoparticles have no more than 100 PGM atoms, and wherein the PGM nanoparticles have a mean particle size of 1 nm to 10 nm with a standard deviation (SD) no more than 1 nm.

2. The catalyst article of claim 1, wherein the PGM nanoparticles have an average particle size of about 1 to about 5 nm.

3. The catalyst article of claim 1, wherein the PGM nanoparticles are Pt.

4. The catalyst article of claim 3, wherein the Pt nanoparticles have a mean particle size of no more than 15 nm after hydrothermal redox aging at 600° C. for 4 hours, wherein the mean particle size is measured by TEM.

5. The catalyst article of claim 3, wherein the Pt nanoparticles have a mean particle size of no more than 20 nm after hydrothermal redox aging at 700° C. for 4 hours, wherein the mean particle size is measured by TEM.

6. The catalyst article of claim 3, wherein the Pt nanoparticles have a mean particle size of no more than 25 nm after hydrothermal redox aging at 800° C. for 4 hours, wherein the mean particle size is measured by TEM.

7. The catalyst article of claim 3, wherein the Pt nanoparticles have 2 to 100 Pt atoms.

8. The catalyst article of claim 7, wherein the Pt nanoparticles have 30 to 100 Pt atoms.

9. The catalyst article of claim 3, wherein the Pt nanoparticles have a mean particle size of no more than 50 nm after aging at 1000° C. for 4 hours, wherein the mean particle size is measured by TEM.

10. The catalyst article of claim 3, wherein the Pt nanoparticles have a mean particle size of no more than 30 nm after hydrothermal redox aging at 800° C. for 4 hours, wherein the mean particle size is measured by CO-pulse method.

11. The catalyst article of claim 3, wherein the Pt nanoparticles have a mean particle size of no more than 60 nm after hydrothermal redox aging at 900° C. for 4 hours, wherein the mean particle size is measured by CO-pulse method.

12. The catalyst article of claim 3, wherein the Pt nanoparticles have a mean particle size of no more than 80 nm after aging at 1000° C. for 4 hours, wherein the mean particle size is measured by CO-pulse method.

13. The catalyst article of claim 3, wherein the Pt nanoparticles are atomically resolved.

14. The catalyst article of claim 13, wherein the Pt nanoparticles have 12 to 28 Pt atoms.

15. The catalyst article of claim 3, wherein frequency of adsorbed CO molecule is lower than 2080 cm$^{-1}$ at 200° C. by IR spectroscopy.

16. The catalyst article of claim 3, wherein frequency of adsorbed CO molecule is lower than 2070 cm$^{-1}$ at 200° C. by IR spectroscopy.

17. An emission treatment system for treating a flow of a combustion exhaust gas comprising the catalyst article of claim 1.

18. The emission treatment system of claim 17 further comprising a second catalyst article.

19. The emission treatment system of claim 18, wherein the second catalyst article comprises Three-Way Catalyst (TWC) component.

20. The emission treatment system of claim 18, wherein the second catalyst article is downstream of the catalyst article.

* * * * *